(12) United States Patent
Sawaguchi

(10) Patent No.: US 9,304,589 B2
(45) Date of Patent: Apr. 5, 2016

(54) HAPTIC SOLENOID AND HAPTIC SOLENOID MOUNTING STRUCTURE

(71) Applicant: TOKYO PARTS INDUSTRIAL CO., LTD., Isesaki-shi (JP)

(72) Inventor: Takami Sawaguchi, Isesaki (JP)

(73) Assignee: Tokyo Parts Industrial Co., Ltd., Gunma-ken (JP)

(*) Notice: Subject to any disclaimer, the term of this patent is extended or adjusted under 35 U.S.C. 154(b) by 50 days.

(21) Appl. No.: 14/271,993

(22) Filed: Jun. 10, 2014

(65) Prior Publication Data

US 2015/0002279 A1    Jan. 1, 2015

(30) Foreign Application Priority Data

Jul. 1, 2013  (JP) ................................ 2013-137837
Apr. 9, 2014  (JP) ................................ 2014-79809

(51) Int. Cl.
*H01H 51/34* (2006.01)
*G06F 3/01* (2006.01)
*G06F 3/041* (2006.01)

(52) U.S. Cl.
CPC ............... *G06F 3/016* (2013.01); *G06F 3/041* (2013.01)

(58) Field of Classification Search
CPC .................................................. H04R 2400/03
USPC ........................................... 335/274, 87, 252
See application file for complete search history.

(56) References Cited

U.S. PATENT DOCUMENTS

| | | | | |
|---|---|---|---|---|
| 2,963,626 A | * | 12/1960 | Du Val, Jr. ............. | G05B 19/08 174/255 |
| 4,034,323 A | * | 7/1977 | Homma ................. | H01H 50/56 335/129 |
| 6,030,248 A | * | 2/2000 | Dancel ............... | H01R 12/7005 439/345 |
| 7,178,223 B2 | * | 2/2007 | Mitsuoka ........... | H01H 13/7006 200/406 |
| 7,728,820 B2 | * | 6/2010 | Rosenberg .............. | A63F 13/06 178/18.01 |
| 7,825,903 B2 | * | 11/2010 | Anastas .................. | G06F 3/016 178/18.07 |
| 8,072,317 B2 | * | 12/2011 | Sproelich ................ | H02K 3/50 310/12.26 |
| 8,129,870 B1 | * | 3/2012 | Pusl ....................... | H02K 33/16 310/14 |
| 8,432,702 B2 | * | 4/2013 | Hasegawa ............ | H05K 1/0215 174/262 |
| 2004/0130418 A1 | * | 7/2004 | Tsutsui .................. | H01H 50/12 335/128 |
| 2006/0278011 A1 | * | 12/2006 | Miyasaka ............. | G06F 3/0338 73/753 |
| 2011/0043310 A1 | * | 2/2011 | Cardone .............. | B23Q 3/1546 335/289 |
| 2011/0149523 A1 | * | 6/2011 | Yanagida .............. | G06F 1/1616 361/724 |
| 2011/0235288 A1 | * | 9/2011 | Yamamoto ........... | G11B 25/043 361/752 |
| 2012/0299857 A1 | | 11/2012 | Grant et al. | |

FOREIGN PATENT DOCUMENTS

JP       2008-516348     5/2008
WO   WO-2006/042309   4/2006

* cited by examiner

*Primary Examiner* — Alexander Talpalatski
(74) *Attorney, Agent, or Firm* — Jordan and Hamburg LLP

(57) ABSTRACT

A haptic solenoid comprises a fixed member and a movable member that supports the fixed member with an elastic member, wherein the fixed member is fastened to a mounting device, and the movable member is linked to a vibrated body to transmit vibration by the movable member to the vibrated body. The fixed member includes a reference hole as a reference point for fastening to the mounting device using a screw. The movable member includes first adjustment holes that are larger than the first mounting holes provided on the vibrated body.

8 Claims, 2 Drawing Sheets

(a)

(b)

(c)

HAPTIC SOLENOID AND HAPTIC SOLENOID MOUNTING STRUCTURE

TECHNICAL FIELD

The present invention relates to haptic solenoids and mounting structures of the same that give users sensory feedback, for example when a virtual button is pressed on a touch panel.

BACKGROUND OF THE INVENTION

As a device equipped with a sensory feedback feature, Japanese Patent Laid-Open Publication No. 2008-516348 discloses a device that includes a case (mounting device), a touch-sensor type panel (a vibrated body), and an actuator. This actuator includes an L-shaped pole unit that includes a fixed pole and a movable pole, a structural element which is a fixed member and a movable member, and a bias element composed of an elastic member. The fixed member of this actuator is linked to a case. The movable member on the actuator is linked to the touch-sensor type panel. Also, when a current to this actuator is turned on and off, the movable pole is magnetically attracted and separated from the fixed pole thereby elastically deforming the bias element, and vibrating the touch-sensor type panel.

However, because the touch-sensor type panel and the case are separate bodies, it is relatively easy for the mounting holes fix screws on the case side that mounts the fixed member of the actuator, and the position for the mounting holes for screws on the touch-sensor type panel that mounts the movable member of the actuator to shift out of position when assembling the touch-sensor type panel into the case. If the actuator is linked to the touch-sensor type panel and the case while these are mispositioned, deformation that is outside what is predetermined occurs at the bias element composed of the elastic member, and the relative positions of the fixed member and the movable member will vary; there is concern that a predetermined vibration strength will not be attained.

SUMMARY OF THE INVENTION

An object of the present invention, with the working example above, is to provide a haptic solenoid and a mounting structure for the same that solve the problems described above that are associated with prior art technology. Aspects of the present invention will now be described in detail. Where possible, it is acceptable to adopt various combinations of the configuring elements adopted in each aspect described below. Furthermore, aspects or technical characteristics of the present invention are not limited to the descriptions that follow. This will be recognized from the inventive concept that will readily be understood by a person skilled in the art in view of the entire specifications, drawings or descriptions thereof.

A first aspect of the present invention that relates to the haptic solenoid is to equip a fixed member that includes a fixed pole wrapped with a coil; a movable member that includes a movable pole; and an elastic member that supports the movable member on the fixed member, wherein the fixed member is fastened to a mounting device, and the movable member is linked to a vibrated body associated with the mounting device, to transmit vibration by the movable member to the vibrated body, the fixed member includes a reference hole as a reference point for fastening to the mounting device using a screw, and the movable member includes a first adjustment hole for adjusting a linking position to the vibrated body when linking to the vibrated body using a screw.

A second aspect of the present invention that relates to the haptic solenoid is to equip a fixed member that includes a fixed pole wrapped with a coil; a movable member that includes a movable pole; and an elastic member that supports the movable member on the fixed member, wherein the fixed member is fastened to a mounting device, and the movable member is linked to a vibrated body associated with the mounting device, to transmit vibration by the movable member to the vibrated body, the movable member includes a reference hole as a reference point for fastening to the vibrated body using a screw, and the fixed member includes a first adjustment hole for adjusting a fastening position to the mounting device when fastening to the mounting device using a screw.

A third aspect of the present invention that relates to the haptic solenoid is a mounting structure for a haptic solenoid used to transmit vibration by the movable member to the vibrated body, equipped with a fixed member that includes a fixed pole wrapped with a coil; a movable member that includes a movable pole; and an elastic member that supports the movable member on the fixed member, wherein the fixed member is fastened to a mounting device, and the movable member is linked to a vibrated body associated with the mounting device, the fixed member includes a reference hole as a reference point for fastening to the mounting device, the reference hole is formed substantially to be the same size as the reference mounting hole disposed in the mounting device, the movable member includes a first adjustment hole for adjusting a linking position to the vibrated body, wherein the first adjustment hole is formed to be larger than a first mounting hole disposed on the vibrated body, the fixed member is fastened to the mounting device with a first screw using the reference hole and the reference mounting hole, and the movable member is linked to the vibrated body with a second screw using the first adjustment hole and the first mounting hole.

A fourth aspect of the present invention that relates to the haptic solenoid is a mounting structure for a haptic solenoid used to transmit vibration by the movable member to the vibrated body, equipped with a fixed member that includes a fixed pole wrapped with a coil; a movable member that includes a movable pole; and an elastic member that supports the movable member on the fixed member, wherein the fixed member is fastened to a mounting device, and the movable member is linked to a vibrated body associated with the mounting device, the movable member includes a reference hole as a reference point for fastening to the vibrated body, the reference hole is formed substantially to be the same size as the reference mounting hole disposed in the vibrated body, the fixed member includes a first adjustment hole for adjusting a fastening position to the mounting device, wherein the first adjustment hole is formed to be larger than a first mounting hole disposed on the mounting device, the movable member is linked to the vibrated body by the first screw using the mounting hole and the reference mounting hole, and the fixed member is fastened to the mounting device with a second screw using the first adjustment hole and the first mounting hole.

Pursuant to one or more embodiments of the present invention, even when the positions of a screw mounting hole in the mounting device side and a mounting hole for a screw in the vibrated body vary between products, it is possible to absorb the variations in positions using a reference hole and a first adjustment hole formed in the haptic solenoid. This results in preventing deformation that is outside of what is predetermined for the elastic member on the haptic solenoid, and being able to suppress variations in a gap between a fixed pole and a movable pole thereby making it possible to attain a highly reliable predesigned, and predetermined vibrating force.

Figure 2:
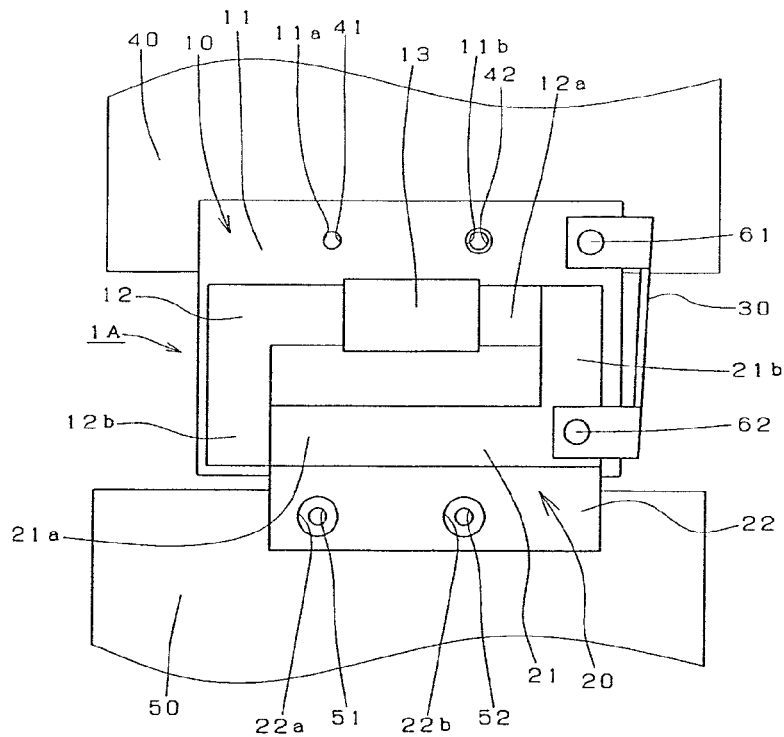
Figure 3:
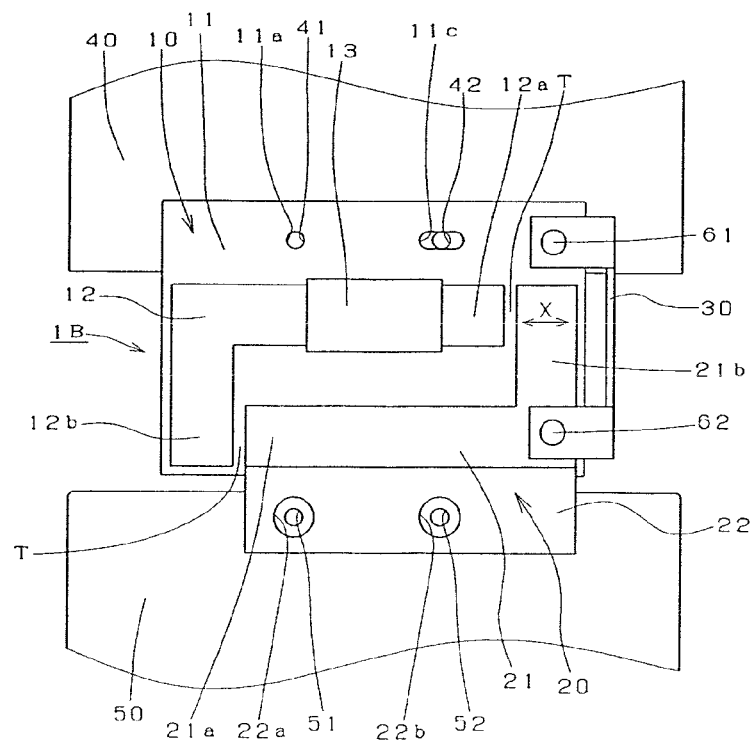

1(a) is a front elevation view;

1(b) is a sectional view of the haptic solenoid seen from cutting-plane line A-A in 1(a);

1(c) is a view on arrows of the haptic solenoid seen from arrows B-B in 1(a);

FIG. 2 is a front elevated view of an operating state of the haptic solenoid pursuant to a working example of the present invention; screws that are fastening members are omitted; and FIG. 3 is a front elevated view of the initial state of the haptic solenoid pursuant to a working example of the present invention; screws that are fastening members are omitted.

DETAILED DESCRIPTION OF THE PREFERRED EMBODIMENTS

Aspects of the present invention will now be illustratively described based on the drawings.

A first embodiment of the present invention will now be described with reference to FIGS. 1 and 2. The haptic solenoid 1A is equipped with a fixed member 10, a movable member 20, and an elastic member 30 that supports the movable member 20 on the fixed member 10.

The fixed member 10 is fastened to a mounting device 40. Conversely, the movable member 20 is linked to a vibrated body 50 that is associated with the mounting device 40; vibration caused by the movable member 20 is transmitted to the vibrated body 50.

As the vibrated body 50, a touch-sensor type panel used in an input device installed on a vehicle and the like is acceptable; as the mounting device 40, a frame (case) for the input device that supports this touch-sensor type panel can be used. However, these are not to be construed as limitations.

A reference mounting hole 41 and a second mounting hole 42 for fastening the fixed member 10 using screws are disposed in the mounting device 40. Conversely, first mounting holes 51, 52 for linking the movable member 20 by screws are disposed in the vibrated body 50.

The reference mounting hole 41, the second mounting hole 42, and the first mounting holes 51, 52 in this example are round holes of the same size. Also, screws are used that have an outer diameter that is substantially the same as the inner diameter of each mounting hole, in each mounting hole.

The fixed member 10 includes a fixed pole 12 wrapped with a coil 13, and a base member 11.

The fixed pole 12 is composed of laminated body of a plate-shaped core formed into an shape that includes a long leg 12a and a short leg 12b. The coil 13 is partially wrapped on the long leg 12a.

The base member 11 is formed into a flat, plate shape using a hard resin. The fixed pole 12 wrapped with the coil 13, is fastened to a top face thereof, by fastening means, not shown in the drawing. A reference hole 11a is disposed in the base member 11 as a reference point for fastening the fixed member 10 to the mounting device 40 using a screw.

This reference hole 11a is a round hole formed substantially to be the same size as the reference mounting hole 41 disposed in the mounting device 40. This is substantially the same size as an outer diameter of the screws used to fasten the fixed member 10 to the mounting device 40 using the reference hole 11a and the reference mounting hole 41. This is to link the haptic solenoid 1A to the mounting device 40 and the vibrated body 50 using this reference hole 11a as a reference point.

Also, a second adjustment hole 11b is disposed in the base member 11 for fastening the fixed member 10 to the mounting device 40 using a screw. This second adjustment hole 11b is a round hole that is larger than the second mounting hole 42 disposed in the mounting device 40.

The movable member 20 includes a movable pole 21 and a transmission member 22. The movable pole 21 is composed of laminated body of a plate-shaped core formed into an L shape that has a long leg 21a and a short leg 21b. This movable pole 21 is juxtaposed facing opposite to the fixed pole 12. The long leg 21a is arranged with a gap T to the short leg 12b, and the short leg 21b is arranged with a gap T to the long leg 12a.

The transmission member 22 transmits movement of the movable pole 21 to the vibrated body 50; this is integrated to the movable pole 21.

The transmission member 22 in this working example is formed by extending the plate-shaped core at the lowermost layer that composes a portion of the movable pole 21.

Figure 1:
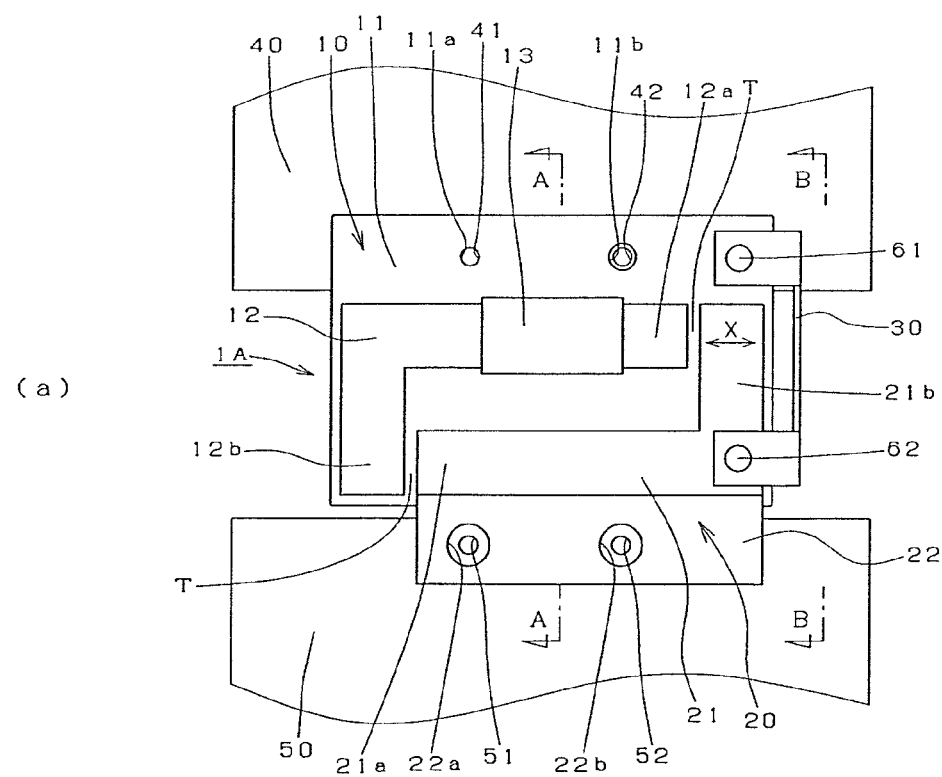
FIG. 1 is a view of an initial state of a haptic solenoid pursuant to a working example of the present invention.
Figure 1:
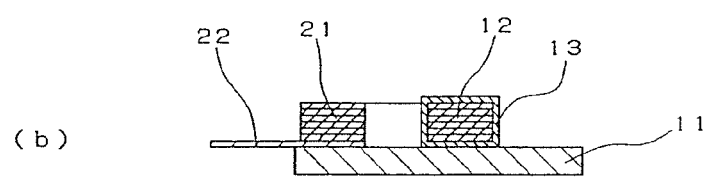
Figure 1:
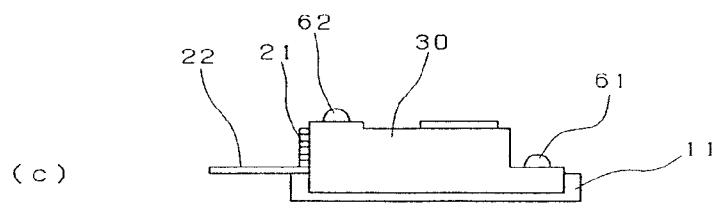

Also, the movable member 20 is arranged to move in X directions in FIG. 1, at a top face of the base member 11, and to move in the X directions by magnetic attraction to the fixed pole 12 when power is supplied to the coil 13.

Two first adjustment holes 22a and 22b are disposed in the transmission member 22 to adjust the linking position to the vibrated body 50 when linking the movable member 20 to the vibrated body 50 using screws. These first adjustment holes 22a and 22b are round holes that are larger than the first mounting holes 51 and 52 disposed on the vibrated body 50.

The elastic member 30 is composed of a metal leaf spring to maintain the movable pole 21 at a position separated only a predetermined distance (gap T) from the fixed pole 12 when power is not being supplied to the coil 13 (an initial state in FIG. 1). One end of the elastic member 30 is fastened to the base member 11 of the fixed member 10 by screw 61; another end of the elastic member 30 is fastened to the movable pole 21 of the movable member 20 by a screw 62.

When electric power is supplied to the coil 13 on the haptic solenoid 1A in this embodiment, in the initial state depicted in FIG. 1, the movable member 20 rebounds to the elastic force of the elastic member 30, and moves in the X direction to the left of FIG. 1 by being magnetically attracted to the fixed pole 12; the movable pole 21 abuts the fixed pole 12. (See FIG. 2) When the magnetic attraction force of the fixed pole 12 is reduced by electric power no longer being supplied to the coil 13, the movable member 20 is urged in a direction (to the right in the X direction of FIG. 1) away from the fixed pole 12 by the elastic force of the elastic member 30, thereby returning to the initial state depicted in FIG. 1.

With the haptic solenoid such as the one in this working example, it is necessary to set the minimum gap to several hundred μm to 1 mm for the gap T between the fixed pole 12 and the movable pole 21. If this gap T is too small, the amount of vibration will be small because the amount of movement of the movable member 20 is small, and restricted, so the predetermined amount of vibration required for haptic feedback is not attained. Conversely, if this gap T is too large, the amount of vibration will be small because the magnetic attraction force that the fixed pole 12 moves the movable pole 21 will be too small, and in the same way, the predetermined amount of vibration required for haptic feedback will not be attained. Therefore, the haptic solenoid like the one in this working example requires highly precise positioning when mounting the mounting device 40 and the vibrated body 50.

The mounting device 40 equipped with the fixed member 10 for the haptic solenoid, and the vibrated body 50 equipped with the movable member 20 for the haptic solenoid normally are composed separately so the relative positional relationship of the mounting device 40 and the vibrated body 50 does vary, albeit only slightly, between products. For that reason, it is relatively easy for the positions of the mounting holes for the screws, disposed in the mounting device 40 to mount the fixed member 10, and the mounting holes for screws, disposed in the vibrated body 50 to mount the movable member 20 to vary between products.

If the fixed member 10 and the movable member 20 are coupled to the mounting device 40 and the vibrated body 50 when these positions are shifted, a predetermined deformation will occur in the elastic member 30. The gap T between the fixed pole 12 and the movable pole 21 in the initial state vary between products. The result is that there is concern for attaining the predetermined vibration depending on the product.

Particularly, with the haptic solenoid with the movable member 20 supported on the fixed member 10 by the elastic member 30, it is easy to follow those fluctuations by flexing of the elastic member 30, so fluctuations easily occur in the gap T. Therefore, with the haptic solenoid like the one in this working example, if variations occur in the positions of each mounting hole for the mounting device 40 and the vibrated body 50, a special mounting structure is required to maintain a constant gap T.

Therefore, with the haptic solenoid 1A in this working example, the reference hole 11a is equipped to be a reference point when using a screw to fasten the fixed member 10 to the base member 11, and to the mounting device 40, and the second adjustment hole 11b is additionally equipped. Also, when linking to the vibrated body 50 using screws, the first adjustment screw holes 22a and 22b are disposed in the transmission member 22 of the movable member 20 to adjust the linking position to the vibrated body 50.

The reference hole 11a is formed substantially to be the same size as the reference mounting hole 41 disposed in the mounting device 40. Furthermore, the second adjustment hole 11b is formed to be larger than the second mounting hole 42 disposed on the mounting device 40. Also, the first adjustment holes 22a and 22b are formed to be larger than the first mounting holes 51 and 52 disposed on the vibrated body 50.

Also, the fixed member 10 is fastened to the mounting device 40 by a first screw (not shown in the drawing) using the reference hole 11a and the reference mounting hole 41, and is fastened to the mounting device 40 by a third screw not shown in the drawing) using the second adjustment hole 11b and the second mounting hole 42. Also, the movable member 20 is linked to the vibrated body 50 by a second screw (not shown in the drawing) using the first adjustment holes 22a and 22b and the first mounting holes 51 and 52. For that reason, pursuant to this working example, even if there is some variation between products for the relative positions of the reference mounting hole 41 and the first mounting holes 51 and 52 (variations in four directions of up, down, left, and right in FIG. 1), the reference hole 11a and the first adjustment holes 22a and 22b will absorb such variations in arrangement. Also, even if there is some variation in the arrangement of the reference mounting hole 41 and the second mounting hole 42, the reference hole 11a, and the second mounting hole 11b will absorb that variation in arrangement.

More specifically, by coupling the fixed member 10 with the first screw using the reference hole 11a and the reference mounting hole 41, the fixed member 10 is linked to the mounting device 40 using the reference hole 11a as a reference point. Next, by linking the fixed member 10 to the mounting device 40 with the third screw using the second adjustment hole 11b and the second mounting hole 42, variations in the arrangement of the reference mounting hole 41 and the second mounting hole 42 are absorbed by the second adjustment hole 11b that is formed to be larger than the second mounting hole 42, so the fixed member 10 can be fastened to the mounting device 40 without rotating around the reference hole 11a. Thereafter, by linking the movable member 20 to the vibrated body 50 with the second screw using the first adjustment holes 22a and 22b and the first mounting holes 51 and 52, variations in the arrangement of the reference mounting hole 41 and the first mounting holes 51 and 52 are absorbed by the first adjustment holes 22a and 22b that are formed to be larger than the first mounting holes 51 and 52, and the movable member 20 can be linked to the vibrated body 50.

Therefore, pursuant to the mounting structure of the haptic solenoid in this working example, it is possible to circumvent with the elastic member 30 any deformation that was not predetermined. The result is that it is possible to mount to the mounting device 40 and the vibrated body 50 so that the gap T between the fixed pole 12 and the movable pole 21 is constant in the initial state, so it is possible to attain a stable, predetermined vibrating force and effectively to suppress variations in the amount of vibration between products.

Also, with this working example, the second adjustment hole 11b is disposed at the base member 11 of the fixed member 10, and the second mounting hole 42 is disposed at the mounting device 40. However, if it is possible easily to link to the mounting device 40 without the fixed member 10 rotating around the reference hole 11a, it is not necessary to dispose the second adjustment hole 11b and the second mounting hole 42.

Also, with the working example described above, the reference mounting hole 41 and the first mounting holes 51 and 52 are separately formed, and the reference mounting hole 41 and the second mounting hole 42 are formed in the same member. For that reason, variations in the arrangement of the reference mounting hole 41 more easily become larger compared to the variations in the arrangement of the reference mounting hole 41 and the second mounting hole 42. Therefore, by forming the first adjustment holes 22a and 22b to be larger than the second adjustment hole 11b, it is possible more efficiently to support variations in the arrangement of each mounting hole. Furthermore, mounting work efficiency is increased, and variations in vibrating amount between products can more securely be suppressed.

Also, the second adjustment hole 11b is a round hole in the working example described above, but it is also acceptable for the second adjustment hole 11c to be a hole elongated in the moving direction (X direction) of the movable member 20, as with the haptic solenoid 1B shown in FIG. 3. In such a case, it is preferred to set the length of the length direction for the elongated hole to be longer than the third screw, and to set the length of the short direction of the elongated hole to be the same as the diameter of the third screw. With such settings, it is possible to fasten the fixed member 10 to the mounting device 40 without rotating around the reference hole 11a, when tightening the second adjustment hole 11c and the second mounting hole 42 using the screw after tightening the reference hole 11a and the reference mounting hole 41 with the screw. For that reason, it is possible to suppress mispositioning of the fixed member 10, and easily to fasten the fixed member 10 to the mounting device 40, it is also possible easily to absorb variations in arrangement of the reference mounting hole 41 and the second mounting hole 42 in the moving direction (X direction) of the movable member 20.

A working example of the present invention has been described above. However, the present invention is not to be construed to be limited to that embodiment. It will be noted that the present invention can be modified in a variety of ways without deviating from the spirit of the present invention.

With the embodiment described above, the reference mounting hole 41, the second mounting hole 42 and the first mounting holes 51, 52 are round holes with the same size. This is not a limitation. It is acceptable for at least one of the reference mounting hole 41, the second mounting hole 42 and the first mounting holes 51, 52 to be a different size. In such a case, the reference hole 11a is formed substantially to be the same size as the reference mounting hole 41 disposed in the mounting device 40. The second adjustment hole 11b is equipped on the fixed member 10, that is larger than the second mounting hole 42 equipped on the mounting device 40. The first adjustment holes 22a and 22b are equipped on the movable member 20, that are larger than the first mounting holes 51 and 52 equipped on the vibrated body 50.

Also, with the working example described above, the reference hole 11a and the second adjustment hole 11b are disposed on the fixed member 10; the first adjustment holes 22a and 22b are disposed on the movable member 20, but it is acceptable to dispose the reference hole on the movable member and not on the fixed member. In other words, the reference hole and the second adjustment hole are disposed on the movable member, and the first adjustment hole may be disposed in the fixed member. Specifically, the reference hole that is a reference point for linking the vibrated body may be disposed on the movable member. This reference hole is formed substantially to be the same size as the reference mounting hole disposed in the vibrated body. Also, the second adjustment hole is equipped on the movable member, that is larger than the second mounting hole equipped on the vibrated body. Also, the first adjustment hole is equipped on the fixed member, that is larger than the first mounting hole equipped on the mounting device. In such a case, by screwing in the second adjustment hole and the second mounting hole after screwing in the reference hole and reference mounting hole, and then screwing in the first adjustment hole and the first mounting hole, the same effect as the working example described above can be attained. Also, in this example, if it is possible to link to the vibrated body without the movable member rotating around the reference hole, it is not necessary to dispose the second adjustment holes and the second mounting hole. Also, with this example, by forming the first adjustment hole to be larger than the second adjustment hole, the same effect as the working example described above can be attained. Still further, with this example, by forming the second adjustment hole to be an elongated hole in the moving direction of the movable member, the same effect as the working example described above can be attained.

What is claimed is:

1. A haptic solenoid mounting structure comprising a fixed member having a fixed pole on which a coil is wound; a mobile member having a mobile pole; and an elastic member that supports the mobile member on the fixed member, wherein the fixed member is fixed on a mounting device and the mobile member is coupled to a vibrated body associated with the mounting device, and is used to transmit vibration from the mobile member to the vibrated body, wherein the fixed member has a reference hole that serves as a reference point when the fixed member is fixed on the mounting device using a screw; the reference hole is formed at substantially the same size as a reference mounting hole that is provided in the mounting device; the mobile member has a first adjustment hole for adjusting the position of coupling to the vibrated body; the first adjustment hole is formed larger than a first mounting hole provided in the vibrated body; the fixed member is fixed on the mounting device by way of a first screw, using the reference hole and the reference mounting hole; and the mobile member is coupled to the vibrated member by way of a second screw using the first adjustment hole and the first mounting hole.

2. The haptic solenoid mounting structure recited in claim 1, wherein the fixed member has a second adjustment hole for fixing the fixed member to the mounting device; the second adjustment hole is formed larger than a second mounting hole that is provided in the mounting device; and the fixed member is fixed on the mounting device by way of a third screw, using the second adjustment hole and the second mounting hole.

3. The haptic solenoid mounting structure recited in claim 2, wherein the reference mounting hole, the first mounting hole and the second mounting hole are formed at the same size; and the first adjustment hole is formed larger than the second adjustment hole.

4. The haptic solenoid mounting structure recited in claim 2, wherein the second adjustment hole is a slot which is elongate in the mobile direction of the mobile member.

5. A haptic solenoid mounting structure comprising a fixed member having a fixed pole on which a coil is wound; a mobile member having a mobile pole; and an elastic member that supports the mobile member on the fixed member, wherein the fixed member is fixed on a mounting device and the mobile member is coupled to a vibrated body associated with the mounting device, and is used to transmit vibration from the mobile member to the vibrated body, wherein the mobile member has a reference hole that serves as a reference point when the mobile member is coupled to the vibrated body; the reference hole is formed at substantially the same size as a reference mounting hole that is provided in the vibrated body; the fixed member has a first adjustment hole for adjusting the position at which the fixed member is fixed to the mounting device; the first adjustment hole is formed larger than a first mounting hole that is provided in the mounting device; the mobile member is coupled to the vibrated body by way of a first screw, using the reference hole and the reference mounting hole; and the fixed member is fixed to the mounting device by way of a second screw, using the first adjustment hole and the first mounting hole.

6. The haptic solenoid mounting structure recited in claim 5, wherein the mobile member has a second adjustment hole for coupling the mobile member to the vibrated body; the second adjustment hole is formed larger than a second mounting hole provided in the vibrated body; and the mobile member is coupled to the vibrated body by way of a third screw, using the second adjustment hole and the second mounting hole.

7. The haptic solenoid mounting structure recited in claim 6, wherein the reference mounting hole, the first mounting hole and the second mounting hole are formed at the same size; and the first adjustment hole is formed larger than the second adjustment hole.

8. The haptic solenoid mounting structure recited in claim 6, wherein the second adjustment hole is a slot, which is elongate in the mobile direction of the mobile member.

* * * * *